(12) United States Patent
Takamura

(10) Patent No.: US 10,257,444 B2
(45) Date of Patent: Apr. 9, 2019

(54) IMAGE PROCESSING APPARATUS, IMAGE PROCESSING METHOD, AND STORAGE MEDIUM STORING PROGRAM

(71) Applicant: CANON KABUSHIKI KAISHA, Tokyo (JP)

(72) Inventor: Akihiro Takamura, Kokubunji (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 119 days.

(21) Appl. No.: 15/188,728

(22) Filed: Jun. 21, 2016

(65) Prior Publication Data

US 2016/0381307 A1    Dec. 29, 2016

(30) Foreign Application Priority Data

Jun. 25, 2015 (JP) ................................. 2015-127874

(51) Int. Cl.
| | |
|---|---|
| *H04N 5/33* | (2006.01) |
| *H04N 5/232* | (2006.01) |
| *H04N 5/235* | (2006.01) |
| *H04N 5/265* | (2006.01) |

(52) U.S. Cl.
CPC ............. *H04N 5/332* (2013.01); *H04N 5/235* (2013.01); *H04N 5/23293* (2013.01); *H04N 5/265* (2013.01)

(58) Field of Classification Search
CPC .... H04N 5/332; H04N 5/23293; H04N 5/235; H04N 5/265
See application file for complete search history.

(56) References Cited

U.S. PATENT DOCUMENTS

2010/0309315 A1* 12/2010 Hogasten ................. H04N 5/33
348/164

FOREIGN PATENT DOCUMENTS

JP    2001-242843 A    9/2001

* cited by examiner

*Primary Examiner* — Michael E Teitelbaum
(74) *Attorney, Agent, or Firm* — Canon U.S.A., Inc. IP Divison

(57) ABSTRACT

An image processing apparatus includes an input unit configured to input a first image generated based on an electromagnetic wave other than visible light, an output unit configured to output a second image as an image obtained by emulating a displayed image using a night vision apparatus or a thermal imaging apparatus based on the first image, and a display processing unit configured to perform processing to cause a display unit to display the second image, wherein the output unit outputs, as the second image, an image obtained by performing at least one of processing to limit a spatial frequency band of the first image, processing to output the first image after storing the first image for a predetermined time, and processing to limit an amount of light of at least a partial region of the first image.

16 Claims, 8 Drawing Sheets

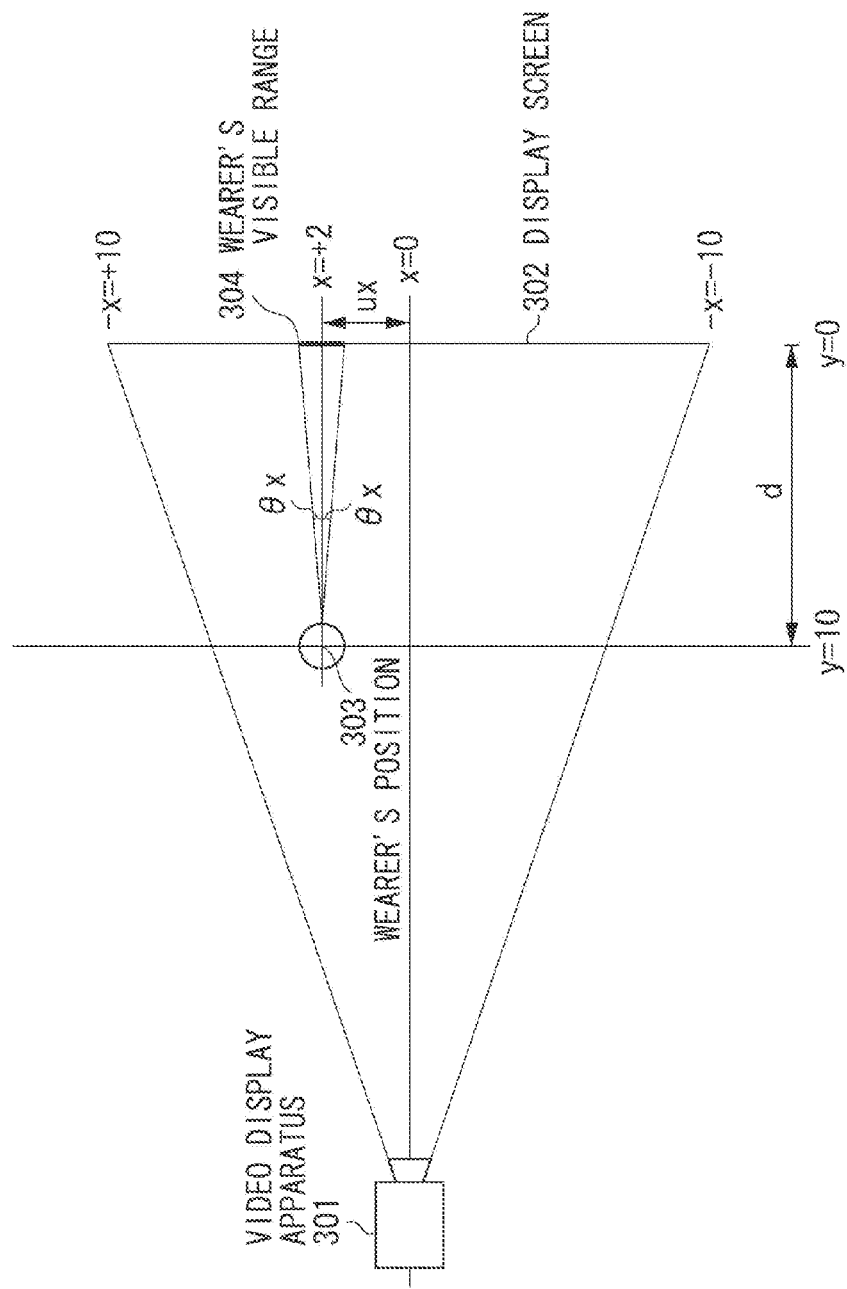

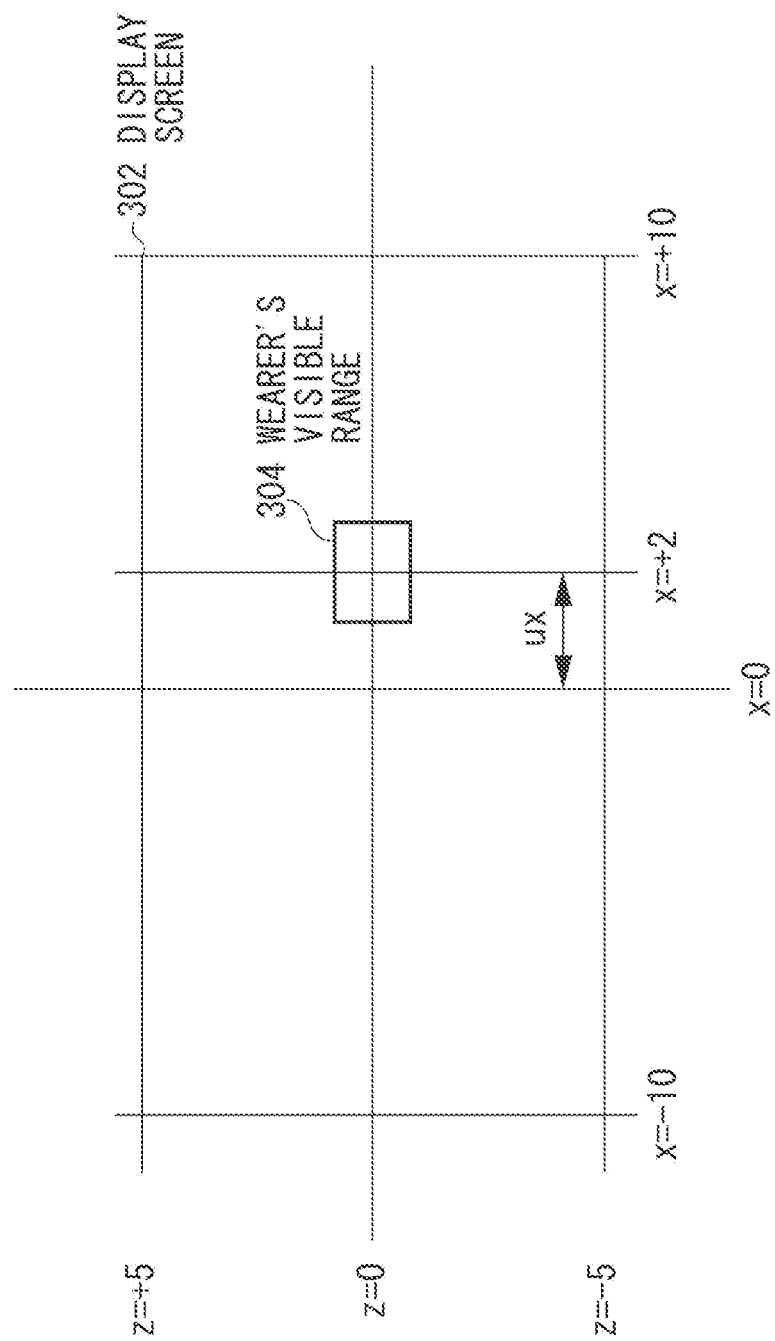

IMAGE PROCESSING APPARATUS, IMAGE PROCESSING METHOD, AND STORAGE MEDIUM STORING PROGRAM

BACKGROUND OF THE INVENTION

Field of the Invention

Aspects of the present invention generally relate to an image processing apparatus, an image processing method, and a storage medium storing a program.

Description of the Related Art

Apparatuses for ensuring a view in the night or dark include a night vision apparatus. Moreover, apparatuses for making a heat source, such as a living object, visible include a thermal imaging apparatus (infrared goggles).

In some cases, such a night vision apparatus or thermal imaging apparatus may make it necessary to show an image viewable via the night vision apparatus or thermal imaging apparatus even to a person who is not using the night vision apparatus or thermal imaging apparatus.

For example, when training is conducted on the assumption that a night vision apparatus is used in the night or dark, training may be carried out by a person wearing the night vision apparatus while a video captured in the night or dark is being displayed by a display apparatus (for example, a projector). Similarly, training may be carried out by a person wearing a thermal imaging apparatus while a video captured with visible light and a video captured in thermal infrared light are being displayed by a display apparatus. Before or after such training, it may become necessary to show an image viewable via the night vision apparatus or thermal imaging apparatus even to a person who is not using the night vision apparatus or thermal imaging apparatus.

In such a case, a video viewable through use of the night vision apparatus or thermal imaging apparatus is displayed. The method of displaying such a video includes a method of actually using a night vision apparatus or thermal imaging apparatus and a method of using an apparatus that emulates a video viewable through use of a night vision apparatus or thermal imaging apparatus.

Japanese Patent Application Laid-Open No. 2001-242843 discusses a technique to, when emulating an image generated by a night vision apparatus, add a noise generated by the night vision apparatus to the image.

However, the technique discussed in Japanese Patent Application Laid-Open No. 2001-242843 does not take into consideration characteristics other than noises as characteristics of the night vision apparatus or thermal imaging apparatus. Therefore, it is not easy to precisely emulate an image generated by the night vision apparatus or thermal imaging apparatus.

SUMMARY OF THE INVENTION

According to an aspect of the present invention, an image processing apparatus includes an input unit configured to input a first image generated based on an electromagnetic wave other than visible light, an output unit configured to output a second image as an image obtained by emulating a displayed image using a night vision apparatus or a thermal imaging apparatus based on the first image, and a display processing unit configured to perform processing to cause a display unit to display the second image, wherein the output unit outputs, as the second image, an image obtained by performing at least one of processing to limit a spatial frequency band of the first image, processing to output the first image after storing the first image for a predetermined time, and processing to limit an amount of light of at least a partial region of the first image.

Further features of the present invention will become apparent from the following description of exemplary embodiments with reference to the attached drawings.

BRIEF DESCRIPTION OF THE DRAWINGS

FIG. 7 illustrates a view as viewed from above a wearer.

FIG. 8 illustrates a view of a display screen as viewed from a front side thereof.

DESCRIPTION OF THE EMBODIMENTS

Figure 1:
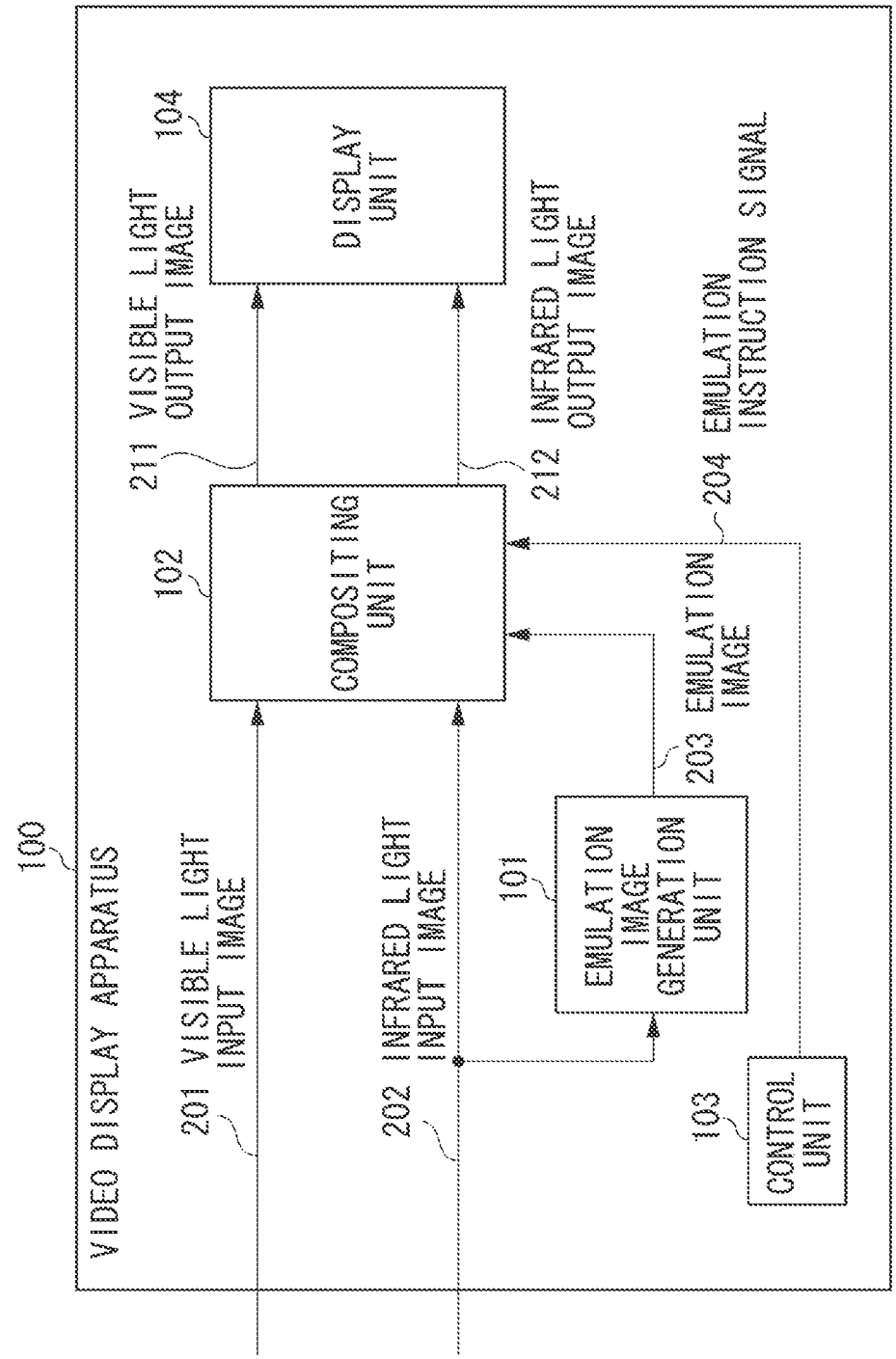
FIG. 1 illustrates a functional configuration of a video display apparatus.

First, it is described how an exemplary embodiment, which is described later below, is arrived at.

As mentioned in the foregoing, the method of displaying a video viewable through use of a night vision apparatus or a thermal imaging apparatus (infrared goggles) includes a method of actually using a night vision apparatus or thermal imaging apparatus and a method of using an apparatus that emulates a video viewable through use of a night vision apparatus or thermal imaging apparatus. Among these methods, the method for actually using a night vision apparatus or thermal imaging apparatus causes a delay time until an image is displayed. This is because, after an image is displayed on the night vision apparatus or thermal imaging apparatus, the image is re-displayed with a delay. If such a delay time becomes large, when, for example, a moving object is viewed, a difference (time lag) occurs between an image displayed on the night vision apparatus or thermal imaging apparatus and an image obtained by emulating the displayed image.

Moreover, in a case where a night vision apparatus is used, since positive feedback occurs, two display apparatuses may be required. More specifically, while a display apparatus that displays a night or dark image is present, when an image displayed on the display apparatus is viewed through use of the night vision apparatus, the viewed image becomes an image brighter than the image displayed on the display apparatus. When the bright image is composited with the input of the display apparatus, which displays a night or dark image, the image displayed by the display apparatus becomes an image brighter than the original night or dark image. Then, the night vision apparatus re-amplifies such an image to generate a bright image. Accordingly, a positive feedback loop is formed in terms of image brightness. Therefore, one, first, display apparatus displays a night or dark image, the night vision apparatus captures an image of the displayed image, another, second, display apparatus displays the image captured by the night vision apparatus, and a person who does not wear the night vision apparatus views the image displayed by the second display apparatus. In this way, in a case where a night vision apparatus is used, it is not easy to implement, with only a single display apparatus, emulating an image generated by the night vision apparatus.

On the other hand, even the method of using an apparatus that emulates a video viewable through use of a night vision apparatus or thermal imaging apparatus causes a delay in the night vision apparatus or thermal imaging apparatus. Accordingly, for example, with regard to a moving object, a difference (time lag) may occur between an image displayed by the apparatus, which emulates the night vision apparatus or thermal imaging apparatus, and an image displayed by the actual night vision apparatus or thermal imaging apparatus. In particular, some night vision apparatuses or thermal imaging apparatuses cause a device to display an image once obtained by a photoelectric sensor. In addition, the sensor includes, for example, a charge-coupled device (CCD) sensor and a complementary metal oxide semiconductor (CMOS) sensor. Moreover, the device includes, for example, a liquid crystal display and an organic light emitting diode (OLED) display. Such night vision apparatuses or thermal imaging apparatuses cause a delay time between a sensor section and a display section.

Furthermore, in many cases, the resolution (band) of an image generated by a night vision apparatus or thermal imaging apparatus is generally low. Moreover, the field of view of a night vision apparatus or thermal imaging apparatus (a wearer who wears the night vision apparatus or thermal imaging apparatus) is limitative. In addition, images generated by a night vision apparatus or thermal imaging apparatus are subjected to vignetting.

The inventors of the present invention have found that, due to the above causes, the conventional technique cannot precisely emulate an image generated by a night vision apparatus or thermal imaging apparatus. The following exemplary embodiments have been developed based on such findings by the inventors. Hereinafter, various exemplary embodiments, features, and aspects of the invention will be described with reference to the drawings.

First, a first exemplary embodiment is described.

FIG. 1 illustrates an example of a functional configuration of a video display apparatus 100.

Referring to FIG. 1, the video display apparatus 100 includes an emulation image generation unit 101, a compositing unit 102, a control unit 103, and a display unit 104.

In the present exemplary embodiment, an apparatus that emulates an image generated by a thermal imaging apparatus and displays the generated image is described as an example of the video display apparatus 100. Therefore, in the present exemplary embodiment, an example is described in which the video display apparatus 100 generates an emulation image 203 based on an infrared light input image 202, composites a visible light input image 201 and the emulation image 203 to form a composite image, and displays the composite image. However, the case of emulating an image generated by a night vision apparatus and displaying the generated image can also be implemented in a similar way as with the case of emulating an image generated by a thermal imaging apparatus and displaying the generated image. Furthermore, as an electromagnetic wave other than visible light, the thermal imaging apparatus uses, for example, thermal infrared light, while the night vision apparatus uses, for example, near-infrared light.

Referring to FIG. 1, the video display apparatus 100 is connected to a video playback apparatus (not illustrated), such as a Blu-ray Disc (registered trademark) player, and is configured to input the visible light input image 201 and the infrared light input image 202 from the video playback apparatus.

The emulation image generation unit 101 generates and outputs an emulation image 203, which is used for emulating an image that the thermal imaging apparatus generates. Details of processing for generating the emulation image 203 are described later below.

The control unit 103 performs control to perform any one of processing for displaying the visible light input image 201 and the infrared light input image 202 and processing for displaying an image obtained by compositing the visible light input image 201 and the emulation image 203 and the infrared light input image 202. Each of the visible light input image 201, the infrared light input image 202, and the image obtained by compositing the visible light input image 201 and the emulation image 203 is displayed on the display unit 104. For example, when performing processing for displaying the visible light input image 201 and the infrared light input image 202, the control unit 103 outputs an emulation instruction signal 204 indicating "disabled" to the compositing unit 102. Furthermore, for example, when performing processing for displaying an image obtained by compositing the visible light input image 201 and the emulation image 203 and the infrared light input image 202, the control unit 103 outputs an emulation instruction signal 204 indicating "enabled" to the compositing unit 102. The control unit 103 can perform such switching in response to a switch mounted on the body of the video display apparatus 100 or can perform such switching in response to a wireless remote control switch or an infrared remote control switch.

When the emulation instruction signal 204 output from the control unit 103 indicates "enabled", the compositing unit 102 composites the emulation image 203 and the visible light input image 201. Then, the compositing unit 102 outputs an image obtained by compositing the emulation image 203 and the visible light input image 201 as a visible light output image 211. On the other hand, when the emulation instruction signal 204 output from the control unit 103 indicates "disabled", the compositing unit 102 outputs the visible light input image 201 and the infrared light input image 202 as a visible light output image 211 and an infrared light output image 212, respectively. Details of the compositing unit 102 are described later below.

Figure 2:
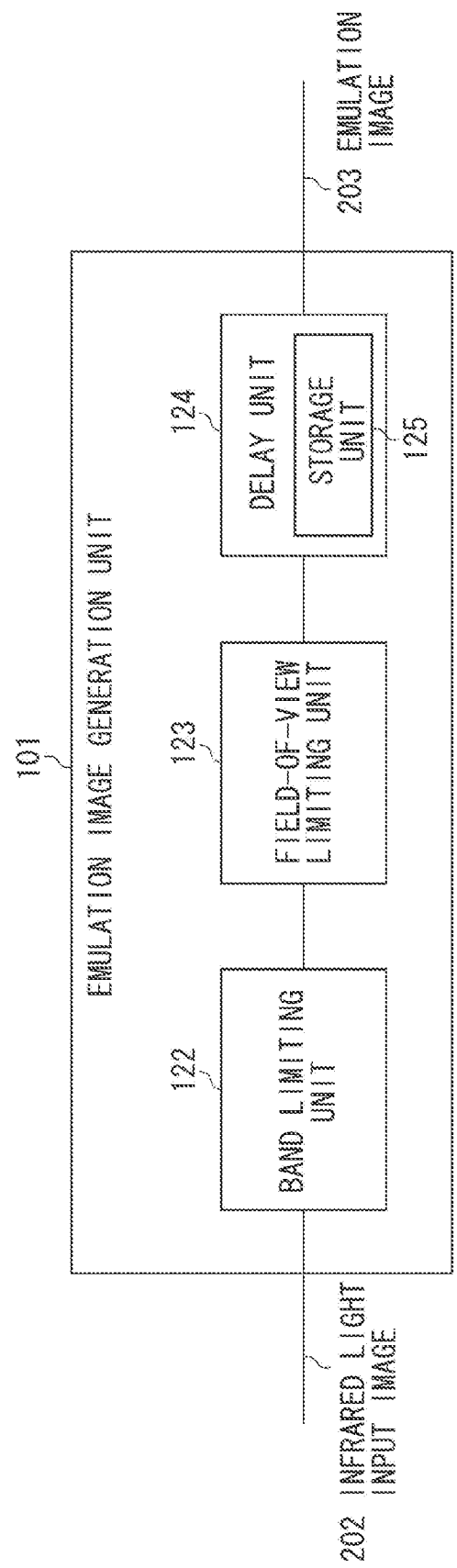
FIG. 2 illustrates a configuration of an emulation image generation unit.

FIG. 2 illustrates an example of a functional configuration of the emulation image generation unit 101.

Referring to FIG. 2, the emulation image generation unit 101 includes a band limiting unit 122, a field-of-view limiting unit 123, and a delay unit 124. In the present exemplary embodiment, an example is described in which the band limiting unit 122, the field-of-view limiting unit 123, and the delay unit 124 perform processing in that order. However, the order of processing operations performed by the band limiting unit 122, the field-of-view limiting unit 123, and the delay unit 124 can be freely changed. Furthermore, a further function can be added to the emulation image generation unit 101.

The band limiting unit 122 limits the frequency band of the infrared light input image 202 using a low-pass filter (LPF) so as to emulate the resolution of the thermal imaging apparatus. In other words, the band limiting unit 122 limits the spatial frequency band of the infrared light input image 202. The LPF is configured to come as close as possible to processing to be emulated in the thermal imaging apparatus. For example, in a case where the optical resolution of the thermal imaging apparatus is low, the LPF can be configured with only a digital FIR filter. Furthermore, in a case where processing is performed inside the thermal imaging apparatus in such a way as to once attain a specific pixel resolution, the band limiting unit 122 can perform, for example, the following processing. Specifically, the band limiting unit 122 can perform down sampling after applying LPF to the infrared light input image 202 and then perform up sampling after matching the pixel resolution of the infrared light input image 202 to the pixel resolution subjected to the above processing. The processing performed by the band limiting unit 122 is not limited to the above processing as long as it emulates the resolution of the thermal imaging apparatus.

The field-of-view limiting unit 123 derives attenuation values of the amount of light with respect to coordinates of at least a partial region of an image so as to emulate at least one of the decrease of the field of view and the vignetting of the thermal imaging apparatus. Then, the field-of-view limiting unit 123 multiplies pixel values of the infrared light input image 202 input from the band limiting unit 122 by the derived attenuation values of the amount of light. For example, the field-of-view limiting unit 123 is able to acquire attenuation values of the amount of light with respect to coordinates of the image from a table in which coordinates of the image and attenuation values of the amount of light are stored in association with each other. Moreover, the field-of-view limiting unit 123 is able to obtain the vignetting by performing a calculation using a calculating formula defining the vignetting with the center of the infrared light input image 202 used as the lens center, and to derive attenuation valued of the amount of light with respect to coordinates of the image. The calculating formula defining the vignetting is, for example, a formula representing the relationship between the distance from the lens center and the amount of light. Furthermore, in the present exemplary embodiment, the whole video range of the visible light input image 201 and the infrared light input image 202 input from the video playback apparatus is displayed (emulated) by the video display apparatus 100. Accordingly, in the present exemplary embodiment, the field-of-view limiting unit 123 emulates only the vignetting from among the field of view and the vignetting of the thermal imaging apparatus.

To emulate a delay in the thermal imaging apparatus, the delay unit 124 temporarily stores the infrared light input image 202 into a storage unit 125, and, after the lapse of a predetermined time, reads out and outputs the infrared light input image 202 from the storage unit 125. The predetermined time is previously set as a time corresponding to the delay time of the thermal imaging apparatus. The delay time of the thermal imaging apparatus is a time that is set based on the time from when the video display apparatus 100 inputs the infrared light input image 202 until the thermal imaging apparatus receives the infrared light output image 212 displayed by the display unit 104 and displays the received infrared light output image 212. The time required to match such a set time and the time from when the video display apparatus 100 inputs the infrared light input image 202 until the video display apparatus 100 generates the emulation image 203 and causes the display unit 104 to display the infrared light output image 212 is determined as the delay time of the thermal imaging apparatus.

Owing to the functions of the band limiting unit 122, the field-of-view limiting unit 123, and the delay unit 124, the emulation image generation unit 101 generates the emulation image 203, which is used to emulate an image that is generated by the thermal imaging apparatus, from the infrared light input image 202, and outputs the generated emulation image 203.

Figure 3:
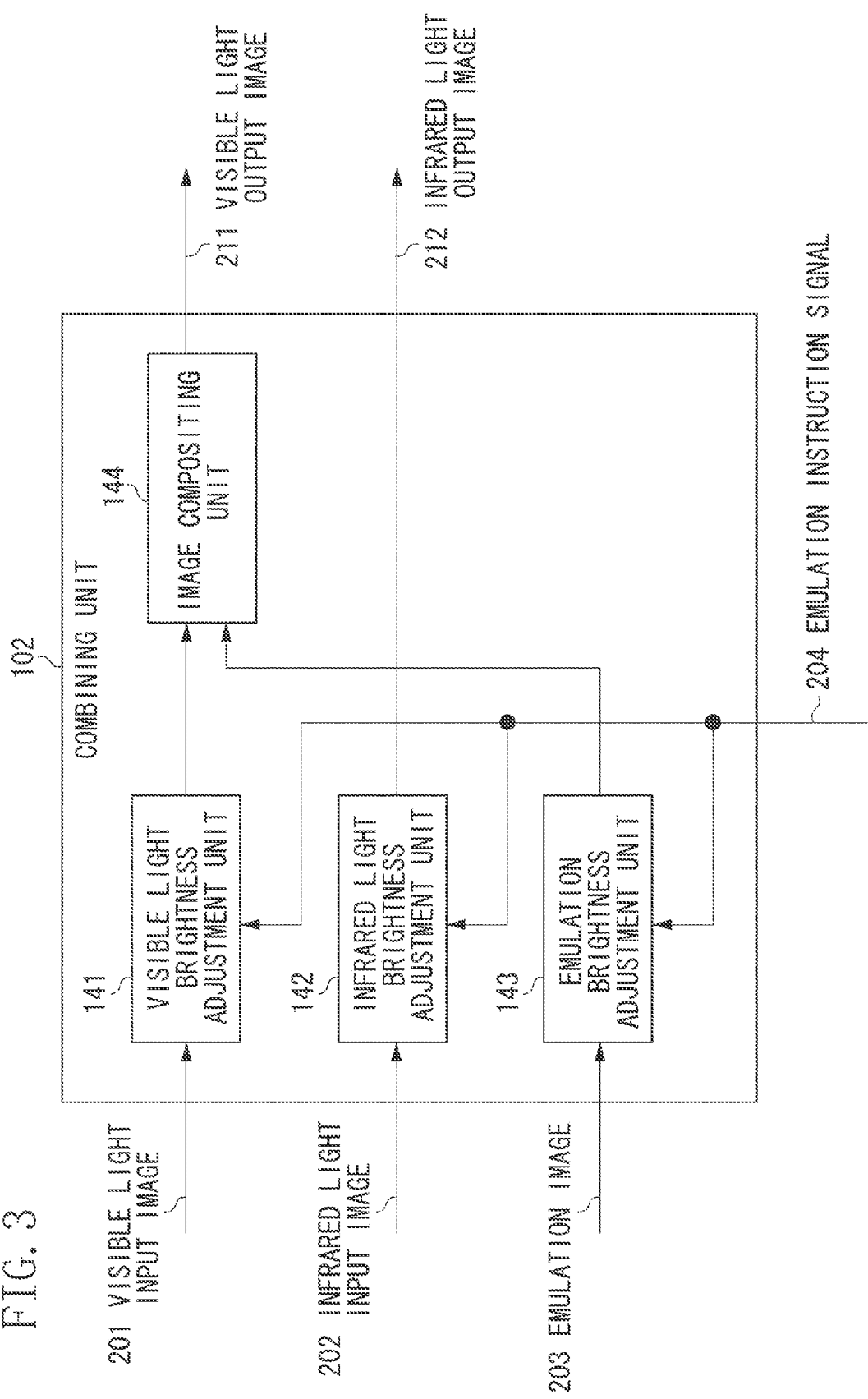
FIG. 3 illustrates a configuration of a compositing unit.

FIG. 3 illustrates an example of a functional configuration of the compositing unit 102.

Referring to FIG. 3, the compositing unit 102 includes a visible light brightness adjustment unit 141, an infrared light brightness adjustment unit 142, an emulation brightness adjustment unit 143, and an image compositing unit (image compositing unit) 144.

When the emulation instruction signal 204 indicates "enabled", the emulation brightness adjustment unit 143 brightens the emulation image 203 and outputs the brightened emulation image 203 (increases the output (pixel values) thereof). On the other hand, when the emulation instruction signal 204 indicates "disabled", the emulation brightness adjustment unit 143 darkens the emulation image 203 and outputs the darkened emulation image 203 (decreases the output (pixel values) thereof). This enables, for example, stopping or weakening displaying of the emulation image 203.

The compositing unit 102 can perform the following processing as a variation of the function of the compositing unit 102.

When the emulation instruction signal 204 indicates "enabled", the infrared light brightness adjustment unit 142 can darken the infrared light input image 202 (can decrease the output (pixel values) thereof). On the other hand, when the emulation instruction signal 204 indicates "disabled", the infrared light brightness adjustment unit 142 can brighten the infrared light input image 202 (can increase the output (pixel values) thereof). With the processing performed as mentioned above, for example, when the emulation image 203 is output, the compositing unit 102 is able to stop displaying of infrared light or to strengthen or weaken displaying of infrared light.

Furthermore, when the emulation instruction signal 204 indicates "enabled", the visible light brightness adjustment unit 141 can darken the visible light input image 201 (can decrease the output (pixel values) thereof). On the other hand, when the emulation instruction signal 204 indicates "disabled", the visible light brightness adjustment unit 141 can brighten the visible light input image 201 (can increase the output (pixel values) thereof). With the processing performed as mentioned above, for example, when the emulation image 203 is output, the compositing unit 102 is able to cause displaying of only the emulation image 203, to lower the rate of displaying of visible light, to cause displaying of only visible light, or to lower the rate of displaying of the emulation image 203.

As described above, in the present exemplary embodiment, for example, the emulation instruction signal 204 indicating "enabled" is an example of a first instruction, and the emulation instruction signal 204 indicating "disabled" is an example of a second instruction.

The image compositing unit 144 composites the output of the visible light brightness adjustment unit 141 and the output of the emulation brightness adjustment unit 143 into a visible light output image 211 and outputs the visible light output image 211. In a normal implementation form, the image compositing unit 144 implements compositing by adding a visible light input image the brightness of which has been adjusted by the visible light brightness adjustment unit 141 and an emulation image the brightness of which has been adjusted by the emulation brightness adjustment unit 143. However, the image compositing unit 144 can perform weighted addition of a visible light input image and an emulation image (addition of both the images after pixel values of at least one of the images are multiplied by weight coefficients for achieving a balance between the images).

Furthermore, to prevent pixel values from becoming saturated, the image compositing unit 144 can add a visible light input image and an emulation image after clipping the pixel values (levels) of the visible light input image and the emulation image. Moreover, before performing addition, the image compositing unit 144 can apply functions for brightness correction to at least one of a visible light input image and an emulation image to correct the brightness of each image. Additionally, after performing addition of a visible light input image and an emulation image, the image compositing unit 144 can clip the pixel values (levels) or can apply the functions for brightness correction.

As described above, in the present exemplary embodiment, the infrared light input image 202 is an example of a first image, the emulation image 203 is an example of a second image, and the visible light input image 201 is an example of a third image.

The display unit 104 performs display processing on the visible light output image 211 and the infrared light output image 212 to display the visible light output image 211 and the infrared light output image 212 on a device. The display unit 104 can generally use various devices, such as a projector, a liquid crystal display, an OLED display, and a cathode ray tube (CRT). However, the display unit 104 is configured to be able to not only display visible light with three primary colors of red (R), green (G), and blue (B) but also perform IR display for displaying infrared light. For example, in a case where the display unit 104 is composed using a projector of the liquid crystal type, a liquid crystal panel for displaying infrared light is provided in addition to a liquid crystal panel for displaying visible light of R, G, and B, and, after infrared light passes through the liquid crystal panel for displaying infrared light to generate an infrared light image, the infrared light image is composited with a visible light image of R, G, and B and is then output. As long as a projector is used, compositing of infrared light and visible light of R, G, and B can be performed prior to entering a projection lens, or can be performed on a screen through a projection lens for visible light of R, G, and B and a projection lens for infrared light, which are individually provided.

Figure 4:
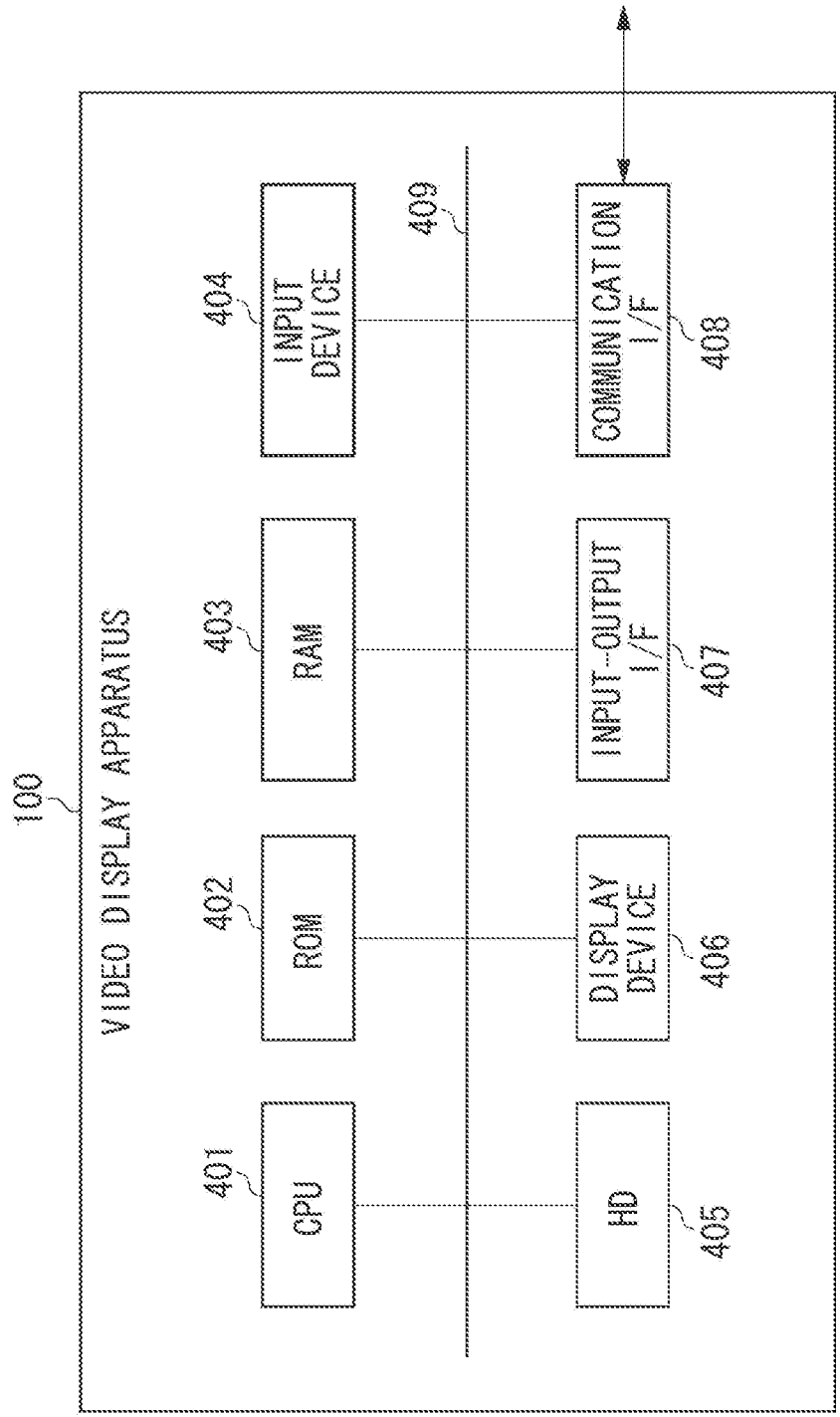
FIG. 4 illustrates a hardware configuration of the video display apparatus.

FIG. 4 illustrates an example of a hardware configuration of the video display apparatus 100.

Referring to FIG. 4, the video display apparatus 100 includes a central processing unit (CPU) 401, a read-only memory (ROM) 402, and a random access memory (RAM) 403. The video display apparatus 100 further includes an input device 404, a hard disk (HD) 405, a display device 406, an input-output interface (I/F) 407, a communication I/F 408, and a system bus 409.

The CPU 401, which comprehensively controls operations performed in the video display apparatus 100, controls the respective constituent components (402 to 408) of the video display apparatus 100.

The ROM 402 stores a Basic Input/Output System (BIOS) and an operating system program (OS), which are control programs for the CPU 401. Moreover, the ROM 402 stores programs or other data required by the CPU 401 to perform processing, which is described later below.

The RAM 403 functions as, for example, a main memory or a work area for the CPU 401. During execution of the processing, the CPU 401 reads out a required program or other data from the ROM 402 or reads out required information or other data from the HD 405 and loads the read-out program, information, or data into the RAM 403. Then, the CPU 401 implements various operations by performing processing of the program, information, or data.

The input device 404 is used for the user to perform an operation input on the video display apparatus 100 as appropriate. The input device 404 is configured using, for example, at least one of a touch panel, a button, and a switch.

The HD 405 serves as a storage unit that stores various pieces of data and files.

The display device 406 includes a device, such as a projector, a liquid crystal display, an OLED display, or a CRT. The display device 406 displays images, such as the visible light output image 211 and the infrared light output image 212, and various pieces of information under the control of the CPU 401.

The input-output I/F 407 performs input and output of data between the video display apparatus 100 and a portable storage medium under the control of the CPU 401.

The communication I/F 408 performs communications of various pieces of information or data via, for example, a network or a communication cable under the control of the CPU 401.

The system bus 409 is a bus for interconnecting the CPU 401, the ROM 402, the RAM 403, the input device 404, the HD 405, the display device 406, the input-output I/F 407, and the communication I/F 408 in such a way as to be able to communicate with each other.

Figure 5:
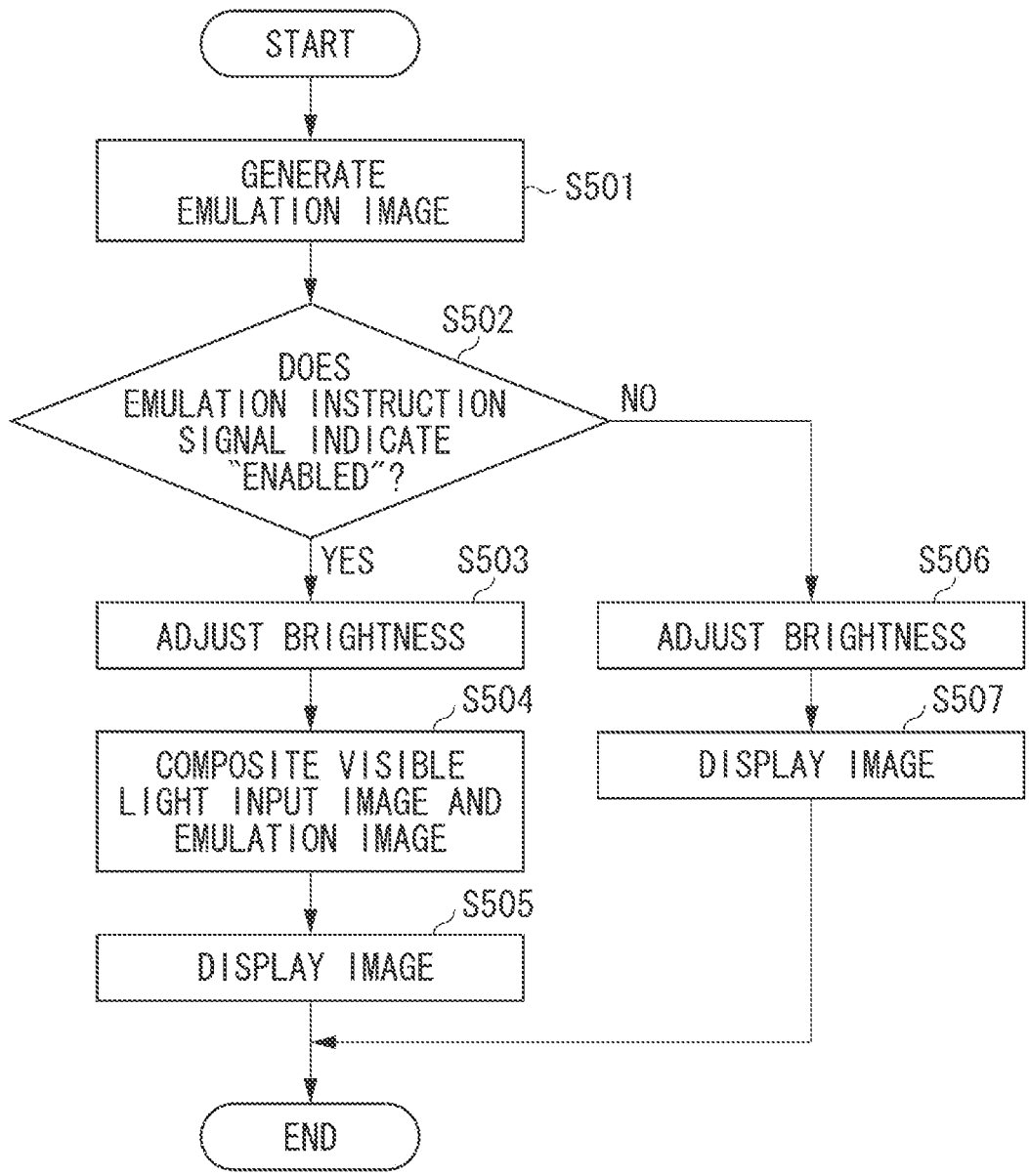
FIG. 5 is a flowchart illustrating processing performed by the video display apparatus.

Next, an example of processing performed in the video display apparatus 100 is described with reference to the flowchart of FIG. 5.

First, in step S501, the emulation image generation unit 101 generates the emulation image 203 from the infrared light input image 202. For this processing, in the present exemplary embodiment, the limitation of the band of the infrared light input image 202 by the band limiting unit 122, the attenuation of the amount of light of the infrared light input image 202 by the field-of-view limiting unit 123, and the retention for a predetermined time of the infrared light input image 202 by the delay unit 124 are performed in that order.

Then, in step S502, the compositing unit 102 determines whether the emulation instruction signal 204 indicates "enabled". If it is determined that the emulation instruction signal 204 does not indicate "enabled" (in other words, indicates "disabled") (NO in step S502), the processing proceeds to step S506, which is described later below.

On the other hand, if it is determined that the emulation instruction signal 204 indicates "enabled" (YES in step S502), the processing proceeds to step S503. In step S503, the emulation brightness adjustment unit 143 brightens the emulation image 203 generated in step S501 (increases pixel values thereof). At this time, at least one of darkening the visible light input image 201 by the visible light brightness adjustment unit 141 and darkening the infrared light input image 202 by the infrared light brightness adjustment unit 142 can be performed.

Then, in step S504, the image compositing unit 144 composites the visible light input image 201 and the emulation image 203 into a visible light output image 211 and outputs the visible light output image 211. More specifically, the image compositing unit 144 adds pixel values of the mutually corresponding pixels of the visible light input image 201 and the emulation image 203. Furthermore, with regard to the visible light input image 201, the brightness may not be adjusted or all of the pixel values may be zero (0).

Then, in step S505, the display unit 104 displays the visible light output image 211, which has been generated in step S504, and the infrared light output image 212, which is the infrared light input image 202 the brightness of which has been adjusted in step S503. Then, the processing in the flowchart of FIG. 5 ends.

If, in step S502, it is determined that the emulation instruction signal 204 does not indicate "enabled" (indicates "disabled") (NO in step S502), the processing proceeds to step S506, as mentioned above. In step S506, the emulation brightness adjustment unit 143 darkens the emulation image 203 generated in step S501 (decreases pixel values thereof). At this time, at least one of brightening the visible light input image 201 by the visible light brightness adjustment unit 141 and brightening the infrared light input image 202 by the infrared light brightness adjustment unit 142 can be performed.

Then, in step S507, the display unit 104 displays the visible light output image 211, which is the visible light input image 201 the brightness of which has been adjusted in step S506, and the infrared light output image 212 (infrared light input image 202). Then, the processing in the flowchart of FIG. 5 ends.

Additionally, in steps S503 and S506, the brightness of at least one of the visible light input image 201, the infrared light input image 202, and the emulation image 203 may not be adjusted.

As described above, in the present exemplary embodiment, to emulate the delay of a night vision apparatus or thermal imaging apparatus, an image generated with infrared light (emulation image 203) is output after the lapse of a predetermined time. Accordingly, for example, when a moving thing or person is viewed, displaying can be performed at a timing close to the timing of an image generated by the actual night vision apparatus or thermal imaging apparatus. Furthermore, to emulate the resolution, the field of view, and the vignetting of a night vision apparatus or thermal imaging apparatus, an image generated with infrared light (emulation image 203) is output after the limitation of the band and the limitation of the amount of light are performed. Accordingly, displaying can be performed with a view close to an actual image generated by the night vision apparatus or thermal imaging apparatus.

If, as in the present exemplary embodiment, all of the delay, the resolution, the field of view, and the vignetting of a night vision apparatus or thermal imaging apparatus are emulated, an image that is generated by a night vision apparatus or thermal imaging apparatus can be emulated and displayed with a higher accuracy. However, at least one of those can be emulated.

Furthermore, in the present exemplary embodiment, an example has been described in which the video display apparatus 100 inputs the visible light input image 201 and the infrared light input image 202. However, the video display apparatus 100 can input only the infrared light input image 202 without inputting the visible light input image 201.

Next, a second exemplary embodiment is described. In the first exemplary embodiment, an example has been described in which the entire video range of the visible light input image 201 and the infrared light input image 202, which are input from a video playback apparatus, is displayed (emulated). On the other hand, in the case of the second exemplary embodiment, a method is described in which, when a person wearing a thermal imaging apparatus in a real space or a person wearing a thermal imaging apparatus in a virtual space (wearer) views a scene through the thermal imaging apparatus, the field of view of the wearer is emulated. Thus, the first exemplary embodiment and the second exemplary embodiment differ mainly in the configuration and processing related to the presence or absence of the field of view to be limited. Accordingly, in the description of the second exemplary embodiment, the same portions as those in the first exemplary embodiment are assigned the respective same reference numerals as the reference numerals assigned in FIGS. 1 to 5, and the detailed description thereof is not repeated.

In the second exemplary embodiment, for ease of description, an example is described in which a single projector, which serves as the display unit 104, projects an image onto a planar screen. However, the screen can have a curved surface, and the projector can include a plurality of projectors. Furthermore, as described in the first exemplary embodiment, the display unit 104 can be implemented using another device, such as a liquid crystal display panel or an OLED display. Moreover, although, for ease of description, an example is described in which the gaze direction of the wearer intersects the screen at right angles, even an arbitrary gaze direction of the wearer can be calculated and implemented.

In the second exemplary embodiment, the virtual space refers to a space usable when a computer generates a simulation image. When the position and the gaze direction of the wearer are set on the virtual space, the computer can generate the field of view of the wearer in the simulation image. Moreover, the virtual space refers to a space usable when, although no wearer actually exists, it is assumed that a wearer exists. In the case of the real space, actual measured values are used as the position and the gaze direction of the wearer. On the other hand, in the case of the virtual space, assumed values are used as the position and the gaze direction of the wearer. With regard to other than the position and the gaze direction of the wearer, the same processing is performed in the real space and the virtual space. In the following, an example is mainly described in which the field of view of a person wearing a thermal imaging apparatus in the real space is emulated.

Figure 6:
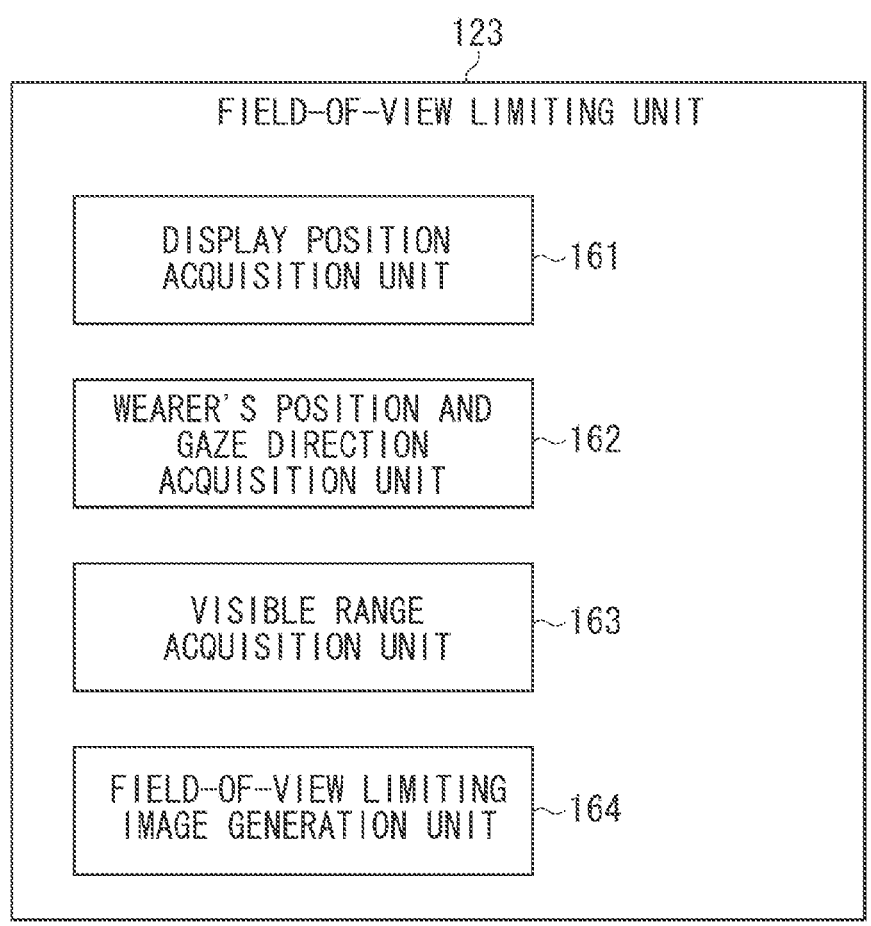
FIG. 6 illustrates a configuration of a field-of-view limiting unit.

FIG. 6 illustrates an example of a functional configuration of the field-of-view limiting unit 123.

As illustrated in FIG. 6, in the second exemplary embodiment, the field-of-view limiting unit 123 includes a display position acquisition unit 161, a wearer's position and gaze direction acquisition unit 162, a visible range acquisition unit 163, and a field-of-view limiting image generation unit 164. Thus, a video display apparatus 301 (FIG. 7) of the second exemplary embodiment and the video display apparatus 100 of the first exemplary embodiment differ in the function of the field-of-view limiting unit 123.

The display position acquisition unit 161 acquires a coordinate range in which the infrared light input image 202 input to the video display apparatus 301 is displayed. FIG. 7 and FIG. 8 each illustrate an example of the coordinate range in which the infrared light input image 202 input to the video display apparatus 301 is displayed and an example of a range of the field of view of a person wearing a thermal imaging apparatus (a wearer) (a wearer's visible range). FIG. 7 illustrates coordinates (x-y axis) in a case where the wearer is viewed from above the wearer. On the other hand, FIG. 8 illustrates coordinates (x-z axis) in a case where the wearer, who directly faces the surface of a display screen 302, views the screen 302. In the examples illustrated in FIGS. 7 and 8, the display position acquisition unit 161 acquires the coordinates "s" of the display screen 302 being present within a range of "$-10 \leq sx \leq +10$, $sy=0$, and $-5 \leq sz \leq +5$".

The wearer's position and gaze direction acquisition unit 162 acquires the position (a wearer's position 303) and the gaze direction of the wearer, who wears the thermal imaging apparatus. The wearer's position and gaze direction acquisition unit 162 is able to acquire the position and the gaze direction of the wearer using, for example, a global positioning system (GPS), an acceleration sensor, a magnetic sensor, or an optical sensor. In the examples illustrated in FIGS. 7 and 8, the coordinates "t" of the position of the wearer (the wearer's position 303) is "tx=2, ty=10, and tz=0". Moreover, the gaze direction of the wearer is the y-axis direction.

The visible range acquisition unit 163 acquires the wearer's visible range 304 on the display screen 302 based on the coordinate range acquired by the display position acquisition unit 161 and the position and gaze direction of the wearer acquired by the wearer's position and gaze direction acquisition unit 162. In the examples illustrated in FIGS. 7 and 8, the gaze direction is assumed to be the y-axis direction. Therefore, the visible range acquisition unit 163 calculates the central coordinates "u" of the gaze of the wearer in the display screen 302 as "ux=2, uy=0, and uz=0".

Then, the visible range acquisition unit 163 calculates a distance "d" between the wearer's position 303 and the central coordinates "u" of the gaze of the wearer in the display screen 302. In the examples illustrated in FIGS. 7 and 8, a difference in the x-axis direction between the wearer's position 303 and the central coordinates "u" of the gaze of the wearer in the display screen 302 is "0", a difference in the y-axis direction therebetween is "10", and a difference in the z-axis direction therebetween is "0". Accordingly, the distance "d" between the wearer's position 303 and the central coordinates "u" of the gaze of the wearer in the display screen 302 is "10".

Then, the visible range acquisition unit 163 calculates the wearer's visible range 304 based on a field of view "θx" in the horizontal direction (the x-axis direction) and a field of view "θz" in the vertical direction (the z-axis direction) of the thermal imaging apparatus and the central coordinates "u" of the gaze of the wearer in the display screen 302. In the examples illustrated in FIGS. 7 and 8, the wearer's visible range 304 in the x-axis direction is calculated as a range from "−d×tanθx+ux" to "+d×tanθx+ux", and the wearer's visible range 304 in the z-axis direction is calculated as a range from "−d×tanθz+uz" to "+d×tanθz+uz".

Furthermore, the field-of-view limiting image generation unit 164 derives an attenuation value of the amount of light with respect to the coordinates of a partial region of the image. More specifically, the field-of-view limiting image generation unit 164 derives a large value (for example, infinity, dark) as an attenuation value of the amount of light with respect to a portion that is not included in the wearer's visible range 304. Moreover, the field-of-view limiting image generation unit 164 derives a small value (for example, "0 (zero)", bright) as an attenuation value of the amount of light with respect to a portion that is included in the wearer's visible range 304. Then, the field-of-view limiting image generation unit 164 multiplies the derived attenuation value of the amount of light by pixel values of the infrared light input image 202 input from the band limiting unit 122. Additionally, in a case where the attenuation value is "0 (zero)", the amount of light of the input infrared light input image 202 is set unchanged.

In the second exemplary embodiment, the control unit 103 can further have a function to output a field-of-view limiting instruction signal indicating whether field-of-view limitation is enabled. In this case, when the field-of-view limiting instruction signal indicates "enabled", the field-of-view limiting unit 123 enables field-of-view limitation (executes the functions of the display position acquisition unit 161, the wearer's position and gaze direction acquisition unit 162, the visible range acquisition unit 163, and the field-of-view limiting image generation unit 164). On the other hand, when the field-of-view limiting instruction signal indicates "disabled", the field-of-view limiting unit 123 disables field-of-view limitation. In this case, the field-of-view limiting unit 123, for example, performs the same processing as in the first exemplary embodiment, or performs no processing.

As mentioned above, in the second exemplary embodiment, the range of the field of view of a person (a wearer) wearing a thermal imaging apparatus (the wearer's visible range 304) is derived, and the amount of light inside the wearer's visible range 304 is more limited than the amount of light outside the wearer's visible range 304. Accordingly, with these processing operations, the field of view at which a person wearing a thermal imaging apparatus or night vision apparatus views an image through the thermal imaging apparatus or night vision apparatus can be emulated. Therefore, displaying can be performed with a view close to an actual image generated by the thermal imaging apparatus or night vision apparatus.

Furthermore, the modification examples described in the first exemplary embodiment can also be applied to the second exemplary embodiment.

Moreover, each of the above-described exemplary embodiments merely represents a specific example in implementing the present invention, and, therefore, should not be construed to limit the technical scope of the present invention. In other words, the present invention can be embodied in various manners without departing from its technical ideas or its principal characteristics.

According to configurations of the above-described exemplary embodiments, an image obtained by precisely emulating an image generated by a night vision apparatus or thermal imaging apparatus can be displayed. Other Embodiments Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)Tm), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-127874 filed Jun. 25, 2015, which is hereby incorporated by reference herein in its entirety.

What is claimed is:

1. An image processing apparatus comprising:
a processor; and
a memory coupled to the processor, the memory having instructions that, when executed by the processor, perform operations comprising:
inputting a first image generated based on an electromagnetic wave other than visible light;
obtaining a visible range of a wearer wearing a night vision apparatus or a thermal imaging apparatus based on a display range of the first image and actual values or assumed values of a position and a gaze direction of the wearer;
outputting a second image as an image obtained by emulating a displayed image using the night vision apparatus or the thermal imaging apparatus based on the first image; and
performing processing to cause a display unit to display the second image,
wherein the outputting outputs, as the second image, an image obtained by performing processing to limit an amount of light of at least a partial region that is not included in the visible range from among an entire region of the first image.

2. The image processing apparatus according to claim 1, wherein the inputting further inputs a third image generated based on visible light.

3. The image processing apparatus according to claim 2, further comprising:
composing the second image and the third image; and
performing processing to cause the display unit to display an image obtained by compositing the second image and the third image.

4. The image processing apparatus according to claim 2, further comprising adjusting brightness of at least one of the second image and at least one of the first image and the third image.

5. The image processing apparatus according to claim 4, wherein when receiving a first instruction, the adjusting performs at least one of processing to increase the brightness of the second image and processing to decrease the brightness of at least one of the first image and the third image, and
when receiving a second instruction, the adjusting performs at least one of processing to decrease the brightness of the second image and processing to increase the brightness of at least one of the first image and the third image.

6. An image processing method comprising:
inputting a first image generated based on an electromagnetic wave other than visible light;
obtaining a visible range of a wearer wearing a night vision apparatus or a thermal imaging apparatus based on a display range of the first image and actual values or assumed values of a position and a gaze direction of the wearer;
outputting a second image as an image obtained by emulating a displayed image using the night vision apparatus or the thermal imaging apparatus based on the first image; and
performing processing to cause a display unit to display the second image,
wherein the outputting outputs, as the second image, an image obtained by performing processing to limit an amount of light of at least a partial region that is not included in the visible range from among an entire region of the first image.

7. The image processing method according to claim 6, further comprising inputting a third image generated based on visible light.

8. The image processing method according to claim 7, further comprising:
compositing the second image and the third image; and
performing processing to cause the display unit to display an image obtained by compositing the second image and the third image.

9. The image processing method according to claim 7, further comprising adjusting brightness of at least one of the second image and at least one of the first image and the third image.

10. The image processing method according to claim 9, further comprising:
performing at least one of processing to increase the brightness of the second image and processing to decrease the brightness of at least one of the first image and the third image when receiving a first instruction; and
performing at least one of processing to decrease the brightness of the second image and processing to increase the brightness of at least one of the first image and the third image when receiving a second instruction.

11. A non-transitory computer-readable storage medium storing computer executable instructions that, when executed by a computer, cause the computer to perform a method comprising:
inputting a first image generated based on an electromagnetic wave other than visible light;
obtaining a visible range of a wearer wearing a night vision apparatus or a thermal imaging apparatus based on a display range of the first image and actual values or assumed values of a position and a gaze direction of the wearer;
outputting a second image as an image obtained by emulating a displayed image using the night vision apparatus or the thermal imaging apparatus based on the first image; and
performing processing to cause a display unit to display the second image,
wherein the outputting outputs, as the second image, an image obtained by performing processing to limit an amount of light of at least a partial region that is not included in the visible range from among an entire region of the first image.

12. The non-transitory computer-readable storage medium according to claim 11, the method further comprising inputting a third image generated based on visible light.

13. The non-transitory computer-readable storage medium according to claim 12, the method further comprising:
compositing the second image and the third image; and performing processing to cause the display unit to display an image obtained by compositing the second image and the third image.

14. The non-transitory computer-readable storage medium according to claim 12, the method further comprising adjusting brightness of at least one of the second image and at least one of the first image and the third image.

15. The non-transitory computer-readable storage medium according to claim 14, the method further comprising:
- performing at least one of processing to increase the brightness of the second image and processing to decrease the brightness of at least one of the first image and the third image when receiving a first instruction; and
- performing at least one of processing to decrease the brightness of the second image and processing to increase the brightness of at least one of the first image and the third image when receiving a second instruction.

16. The image processing apparatus according to claim 1, further comprising performing, for generating the second image, at least one of processing to limit a spatial frequency band of the first image, processing to output the first image after storing the first image for a predetermined time, and processing to limit an amount of light of at least a partial region of the first image.

* * * * *